US009860396B2

(12) United States Patent
Okuno et al.

(10) Patent No.: US 9,860,396 B2
(45) Date of Patent: Jan. 2, 2018

(54) IMAGE PROCESSING APPARATUS AND NON-TRANSITORY COMPUTER-READABLE MEDIUM

(71) Applicant: BROTHER KOGYO KABUSHIKI KAISHA, Nagoya-shi, Aichi-ken (JP)

(72) Inventors: Tetsuya Okuno, Nagoya (JP); Toyoshi Adachi, Kakamigahara (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 0 days.

(21) Appl. No.: 15/469,769

(22) Filed: Mar. 27, 2017

(65) Prior Publication Data
US 2017/0289366 A1    Oct. 5, 2017

(30) Foreign Application Priority Data

Mar. 29, 2016    (JP) .................................. 2016-065471

(51) Int. Cl.
| H04N 1/00 | (2006.01) |
| H04N 1/32 | (2006.01) |
| H04L 29/06 | (2006.01) |

(52) U.S. Cl.
CPC ..... *H04N 1/00244* (2013.01); *H04N 1/00411* (2013.01); *H04N 1/00938* (2013.01); *H04N 1/32561* (2013.01); *H04L 67/42* (2013.01); *H04N 2201/0094* (2013.01)

(58) Field of Classification Search
CPC ................................................ H04N 1/00244
USPC ........................................................ 358/1.15
See application file for complete search history.

(56) References Cited

U.S. PATENT DOCUMENTS

2012/0113468 A1    5/2012    Urakawa

FOREIGN PATENT DOCUMENTS

| JP | 2000-298561 A | 10/2000 |
| JP | 2012-113700 A | 6/2012 |
| JP | 2012-137802 A | 7/2012 |

*Primary Examiner* — Jacky X Zheng
(74) *Attorney, Agent, or Firm* — Scully, Scott, Murphy & Presser, P.C.

(57) ABSTRACT

An image processing apparatus includes an image processing device and a controller configured to obtain data identification information, receive definition data identified by the data identification information, display a definition screen based on the received definition data, receive a designation operation, further obtain the data identification information defined in the screen definition data, control the image processing device to execute image processing defined in the operation definition data, when the obtained data identification information is first identification information for identifying first definition data stored in a first server, determine whether the first identification information coincides with the specific identification information, prior to receiving the definition data, and when the first identification information coincides with the specific identification information, receive second definition data identified by second identification information associated with the specific identification information from a second server.

19 Claims, 13 Drawing Sheets

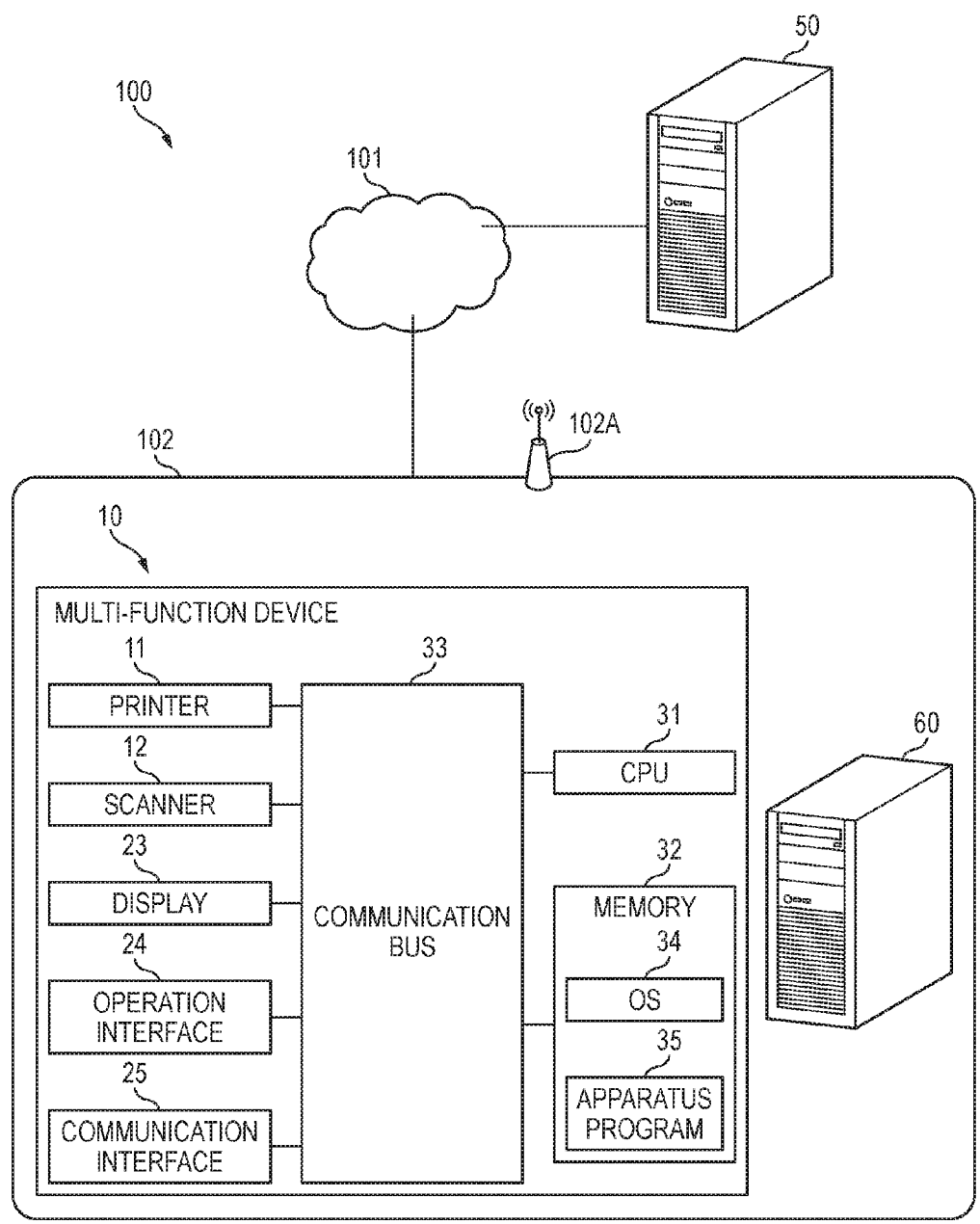

FIG. 2A

| SPECIFIC IDENTIFICATION INFORMATION | STATE INFORMATION | CUSTOM URL |
|---|---|---|
| scan-upload1.xml | LOGIN ID="Guest" | www.server-ctm.com/scan-upload0.xml |
| scan-upload2.xml | — | www.server-ctm.com/scan-upload2.xml |

FIG. 2B

| SPECIFIC IDENTIFICATION INFORMATION | STATE INFORMATION | TYPE INFORMATION | CUSTOM URL |
|---|---|---|---|
| download-print1.xml | REMAINING AMOUNT OF TONER <10% | INSERTION | www.server-ctm.com/download-print0.xml |
| download-print2.xml | — | REPLACEMENT | www.server-ctm.com/download-print2.xml |

FIG. 3A

STANDARD XML (scan-upload1.xml)

```
<COMMAND>
   <NextURL>www.server-std.com/scan-upload2.xml<NextURL>
   <TITLE>SERVER SELECTION SCREEN</TITLE>
   <OPTION_DISPLAY>
      <OPTION>SERVER A</OPTION>
      <OPTION>THE SERVER B</OPTION>
   </OPTION_DISPLAY>
</COMMAND>
```

FIG. 3B

STANDARD XML (scan-upload2.xml)

```
<COMMAND>
   <NextURL>www.server-std.com/scan-upload3.xml<NextURL>
   <TITLE>FORMAT SELECTION SCREEN</TITLE>
   <OPTION_DISPLAY>
      <OPTION>TIFF</OPTION>
      <OPTION>PDF</OPTION>
   </OPTION_DISPLAY>
</COMMAND>
```

FIG. 3C

STANDARD XML (scan-upload3.xml)

```
<COMMAND>
   <TITLE>EXECUTION CONFIRM SCREEN</TITLE>
   <SCAN_UPLOAD>
      <TRANSMISSION DESTINATION> SERVER A</
         TRANSMISSION DESTINATION>
      <FORMAT>TIFF</FORMAT>
   </SCAN_UPLOAD>
</COMMAND>
```

FIG. 3D

CUSTOM XML (scan-upload0.xml)

```
<COMMAND>
  <NextURL>www.server-std.com/scan-upload1.xml<NextURL>
  <TITLE>SECURITY NOTIFICATION SCREEN</TITLE>
  <MESSAGE>
    UPLOAD TO A CLOUD SERVER!
    PLEASE, DO NOT SCAN A SECURITY DOCUMENT!
  </MESSAGE>
  <OPTION_DISPLAY>
    <OPTION>NEXT</OPTION>
    <OPTION>RETURN</OPTION>
  <OPTION_DISPLAY>
</COMMAND>
```

FIG. 3E

CUSTOM XML (scan-upload2.xml)

```
<COMMAND>
  <NextURL>www.server-std.com/scan-upload3.xml<NextURL>
  <TITLE>FORMAT SELECTION SCREEN</TITLE>
  <OPTION_DISPLAY>
    <MESSAGE>SCAN OF AN ESTIMATE SHEET IS </MESSAGE>
    <OPTION>TIFF</OPTION>
    <MESSAGE>SCAN OF A BILL IS </MESSAGE>
    <OPTION>PDF</OPTION>
  </OPTION_DISPLAY>
</COMMAND>
```

FIG. 4A

STANDARD XML (download-print1.xml)

```
<COMMAND>
   <NextURL>www.server-std.com/download-print2.xml<NextURL>
   <TITLE>SERVER SELECTION SCREEN</TITLE>
   <OPTION_DISPLAY>
      <OPTION>SERVER A</OPTION>
      <OPTION>SERVER B</OPTION>
   </OPTION_DISPLAY>
</COMMAND>
```

FIG. 4B

STANDARD XML (download-print2.xml)

```
<COMMAND>
   <NextURL>www.server-std.com/download-print3.xml<NextURL>
   <TITLE> DATA SELECTION SCREEN</TITLE>
   <OPTION_DISPLAY>
      <OPTION>APPLICATION FORM OF PAID HOLIDAY.PDF</OPTION>
      <OPTION>APPLICATION FORM OF BUSINESS TRIP.PDF</OPTION>
   </OPTION_DISPLAY>
</COMMAND>
```

FIG. 4C

STANDARD XML (download-print3.xml)

```
<COMMAND>
   <TITLE>EXECUTION CONFIRM SCREEN</TITLE>
   <DOWNLOAD_PRINT>
      <TRANSMISSION-SOURCE>SERVER B</TRANSMISSION-SOURCE>
      <DATA>APPLICATION FORM OF BUSINESS TRIP.PDF</DATA>
   </DOWNLOAD_PRINT>
</COMMAND>
```

FIG. 4D

CUSTOM XML (download-print0.xml)

```
<COMMAND>
  <TITLE>TONER REPLACEMENT NOTIFICATION SCREEN</TITLE>
  <MESSAGE>
    PLEASE, REPLACE THE TONER!
    A CONTACT POINT (xxx-yyyy-zzzz)
  </MESSAGE>
  <OPTION_DISPLAY>
    <OPTION>NEXT</OPTION>
    <OPTION>RETURN</OPTION>
  <OPTION_DISPLAY>
</COMMAND>
```

FIG. 4E

CUSTOM XML (download-print2.xml)

```
<COMMAND>
  <TITLE>DATA SELECTION SCREEN</TITLE>
  <OPTION_DISPLAY>
    <MESSAGE>APPLICATION OF PAID HOLIDAY IS </MESSAGE>
    <OPTION>APPLICATION FORM OF PAID HOLIDAY.PDF</OPTION>
    <MESSAGE>APPLICATION OF BUSINESS TRIP IS </MESSAGE>
    <OPTION>APPLICATION FORM OF BUSINESS TRIP.PDF</OPTION>
  </OPTION_DISPLAY>
</COMMAND>
```

IMAGE PROCESSING APPARATUS AND NON-TRANSITORY COMPUTER-READABLE MEDIUM

CROSS-REFERENCE TO RELATED APPLICATIONS

This application claims priority from Japanese Patent Application No. 2016-065471 filed on Mar. 29, 2016, the entire subject-matters of which are incorporated herein by reference.

TECHNICAL FIELD

The disclosure relates to an image processing apparatus configured to sequentially execute a plurality of operations in response to an instruction from a server, thereby receiving a supply of services from the server.

BACKGROUND

There has been disclosed a server configured to transmit definition data to an image processing apparatus, to receive an execution result of an operation defined in the definition data from the image processing apparatus, and to transmit next definition data to the image processing apparatus in accordance with the received execution result, thereby supplying services such as scan upload, download print or the like to the image processing apparatus, for example. According to the method, it is possible to supply a new service to the image processing apparatus without updating a program installed in the image processing apparatus.

However, since the server provided on the Internet is accessed by a plurality of unspecified image processing apparatuses, the server can just transmit the same definition data to all the image processing apparatuses. That is, the related-art system is unable to supply a service customized for each of the image processing apparatuses.

SUMMARY

Illustrative aspects of the disclosure to provide an image processing apparatus capable of customizing a service that can be received by executing an operation in accordance with definition data received from a server.

According to one illustrative aspect, there may be provided an image processing apparatus comprising: a communication interface; a display; an operation interface; a memory; an image processing device; and a controller configured to: obtain data identification information; receive definition data, which is identified by the obtained data identification information, from a server through the communication interface; in response to the received definition data being screen definition data, display a definition screen defined in the screen definition data on the display; in response to the definition screen comprising a plurality of parameters, receive a designation operation of designating at least one of the plurality of parameters through the operation interface; in response to receiving the designation operation in the receiving of the designation operation, further obtain the data identification information defined in the screen definition data in the obtaining of the data identification information; and in response to the received definition data being operation definition data, control the image processing device to execute an image processing defined in the operation definition data in accordance with the designated parameter, wherein the data identification information is first identification information for identifying first definition data stored in a first server or second identification information for identifying second definition data stored in a second server, wherein the memory stores therein specific identification information, which is one of a plurality of the first identification information, and the second identification information with associating the specific identification information and the second identification information, wherein in response to the obtained data identification information being the first identification information, the controller is configured to determine whether the first identification information coincides with the specific identification information, prior to receiving the definition data, wherein in response to determining that the first identification information does not coincide with the specific identification information, the controller is configured to receive the first definition data identified by the first identification information from the first server, and wherein in response to determining that the first identification information coincides with the specific identification information, the controller is configured to receive the second definition data identified by the second identification information associated with the specific identification information from the second server.

According to the above configuration, when the first identification information different from the specific identification information is obtained, the first definition data identified by the first identification information is received from the first server, and when the first identification information, which is the same as the specific identification information, is obtained, the second definition data identified by the second identification information associated with the specific identification information is received from the second server. In this way, the first identification information, which corresponds to the definition data for customizing the processing, of the plurality of first identification information to be sequentially obtained is registered in advance in the memory, so that it is possible to receive the second definition data customized for each image processing apparatus.

According to another illustrative aspect of the disclosure, there may be provided a non-transitory computer-readable medium having a computer program stored thereon and readable by a computer of an image processing apparatus, the image processing apparatus comprising a communication interface, a display, an operation interface, a memory and an image processing device, the computer program, when executed by the computer, cause the image processing apparatus to perform: obtaining data identification information; receiving definition data, which is identified by the obtained data identification information, from a server through the communication interface; in response to the received definition data being screen definition data, displaying a definition screen defined in the screen definition data on the display; in response to the definition screen including a plurality of parameters, receiving a designation operation of designating at least one of the plurality of parameters through the operation interface; in response to receiving the designation operation in the receiving of the designation operation, further obtaining the data identification information defined in the screen definition data in the obtaining of the data identification information; in response to the received definition data being operation definition data, controlling the image processing device to execute image processing defined in the operation definition data in accordance with the designated parameter, wherein the data identification information is first identification information for identifying first definition data stored in a first server or second identification information for identifying second definition data stored in a second server, wherein the memory stores therein specific identification information, which is one of a plurality of the first identification information, and the second identification information with associating the specific identification information and the second identification information, wherein in response to the obtained data identification information being the first identification information, the computer program, when executed by the processor, causes the image processing apparatus to perform determining whether the first identification information coincides with the specific identification information, prior to receiving the definition data, wherein in response to determining that the first identification information does not coincide with the specific identification information, the computer program, when executed by the processor, causes the information processing apparatus to perform receiving the first definition data identified by the first identification information from the first server, and wherein in response to determining that the first identification information coincides with the specific identification information, the computer program, when executed by the processor, causes the information processing apparatus to perform receiving the second definition data identified by the second identification information associated with the specific identification information from the second server.

BRIEF DESCRIPTION OF THE DRAWINGS

FIG. 1 depicts an outline of a system 100 in accordance with an illustrative embodiment;

FIGS. 2A and 2B depict an example of a condition list that is to be stored in a memory 32;

FIGS. 3A-3E depict examples of an XML file for implementing scan upload, in which FIGS. 3A to 3C depict standard XMLs and FIGS. 3D and 3E depict custom XMLs;

FIGS. 4A-4E depict examples of an XML file for implementing download print, in which FIGS. 4A to 4C depict standard XMLs and FIGS. 4D and 4E depict custom XMLs;

FIGS. 8A and 8B depict display examples of a display 23, in which FIG. 8A depicts a service selection screen and FIG. 8B depicts a security notification screen;

FIGS. 9A and 9B depict display examples of the display 23, in which FIG. 9A depicts a server selection screen and FIG. 9B depicts a format selection screen defined in the custom XML;

FIGS. 10A and 10B depict display examples of the display 23, in which FIG. 10A depicts a format selection screen defined in a standard XML and FIG. 10B depicts a toner replacement notification screen; and FIGS. 11A and 11B display examples of the display 23, in which FIG. 11A depicts a data selection screen defined in the custom XML and FIG. 11B depicts a data selection screen defined in the standard XML.

DETAILED DESCRIPTION

Figure 5:
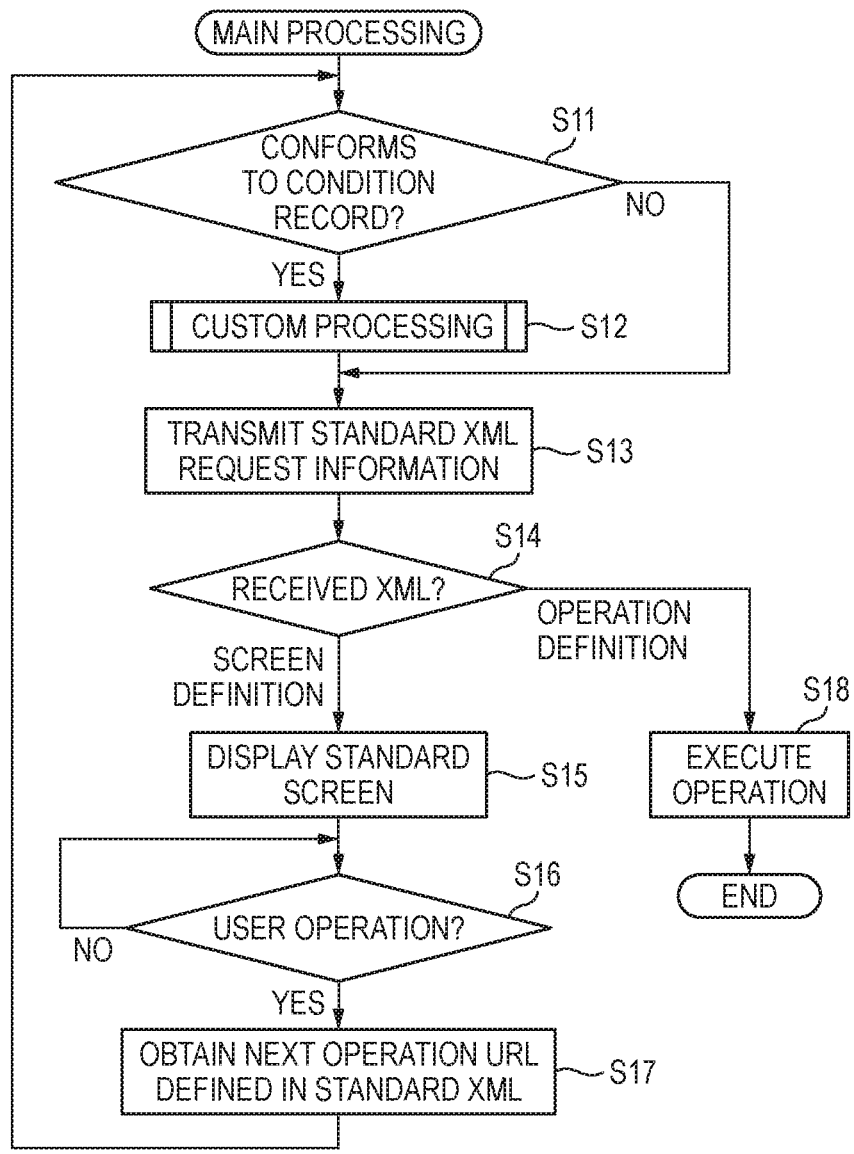
FIG. 5 is a flowchart of main processing.

Hereinafter, an illustrative embodiment of the disclosure will be described with reference to the drawings. In the meantime, the illustrative embodiment to be described later is just an example of the disclosure and the illustrative embodiment of the disclosure can be appropriately changed without departing from the gist of the disclosure. For example, an execution sequence of each processing to be described later can be appropriately changed without departing from the gist of the disclosure.

FIG. 1 depicts an outline of a system 100 in accordance with the illustrative embodiment. The system 100 shown in FIG. 1 includes a multi-function device 10 and servers 50, 60. Also, the system 100 may include a single function machine of a printer, a single function machine of a scanner and the like, instead of the multi-function device 10. The multi-function device 10 and the servers 50, 60 are configured to perform communication via a communication network. The communication network may be the Internet 101, a wired LAN, a wireless LAN 102 or a combination thereof.

The multi-function device 10 and the server 60 belong to the wireless LAN 102. That is, the multi-function device 10 and the server 60 can perform communication with each other via an access point (not shown) of the wireless LAN 102. Also, the wireless LAN 102 is connected to the Internet 101 via a router 102A. Also, the server 50 is connected to the Internet 101. That is, the multi-function device 10 can perform communication with the server 50 via the Internet 101 from the router 102A. Both the servers 50, 60 may also be connected to the Internet 101 or the wireless LAN 102.

In the system 100, the multi-function device 10 is configured to receive a supply of services from the servers 50, 60 by executing processing defined in each of a plurality of definition data sequentially received from the servers 50, 60. The services that are to be supplied by servers 50, 60 include a scan upload service of enabling a scanner 12 to upload generated image data to a storage server (not shown), a download print service of enabling a printer 11 to execute a print operation for image data downloaded from a storage server (not shown), and the like. Meanwhile, in the illustrative embodiment, the image data is not limited to a JPEG format, a TIFF format, a bitmap format and the like, and may have a PDF format, a text format or the like.

[Multi-Function Device 10]

As shown in FIG. 1, the multi-function device 10 mainly has the printer 11, the scanner 12, a display 23, an operation interface 24, a communication interface 25, a CPU 31, a memory 32, and a communication bus 33. The respective constitutional elements of the multi-function device 10 are connected each other through the communication bus 33. The multi-function device 10 is an example of the image processing apparatus.

The printer 11 is configured to execute a print operation of recording an image expressed by image data onto a sheet. As a recording method of the printer 11, a well-known method such as an inkjet method and an electrophotographic method can be adopted. The scanner 12 is configured to execute a scan operation of reading an image recorded on a document and to generate image data. Also, the printer 11 may have a FAX unit configured to execute a FAX transmission operation of FAX-transmitting image data to an external apparatus and a FAX reception operation of FAX-receiving image data from the external apparatus, and the like. The print operation, the scan operation, the FAX transmission operation and the FAX reception operation are examples of an operation for the image data, and the printer 11, the scanner 12 and the FAX unit are examples of the operating device such as the image processing device.

The display 23 is a liquid crystal monitor, an organic EL display or the like, and has a display surface for displaying a variety of information.

The operation interface 24 is a user interface configured to receive a user's input operation. Specifically, the operation interface 24 has buttons, and is configured to output a variety of operation signals associated with the pushed buttons to the CPU 31. Also, the operation interface 24 may have a film-shaped touch sensor superimposed on the display surface of the display 23. An operation of designating an object displayed on the display surface of the display 23 and an operation of inputting a character string or a number string are examples of the user operation. The "object" indicates a character string, an icon, a button, a link, a radio button, a check box, a pull-down menu and the like displayed on the display 23.

The operation interface 24 implemented as a touch sensor is configured to output position information, which indicates a position on the display surface touched by the user. Meanwhile, in the specification, the term "touch" includes all operations of enabling an input medium to contact the display surface. Also, even when the input medium is not in contact with the display surface, "hover" or "floating touch" of bringing the input medium close to a position at which a distance to the display surface is very small may be included in the concept of the "touch". Also, the input medium may be a user's finger, a touch pen or the like. A user operation of tapping a position of an icon displayed on the display 23 is an example of the designation operation of designating the icon.

The communication interface 25 is an interface for performing communication with the external apparatus through the communication network. That is, the multi-function device 10 is configured to transmit a variety of information to the servers 50, 60 through the communication interface 25 and to receive a variety of data or information from the servers 50, 60 through the communication interface 25. The specific communication protocol of the communication interface 25 is not particularly limited but Wi-Fi (a registered trademark of Wi-Fi Alliance) may be adopted, for example.

The CPU 31 is configured to control an overall operation of the multi-function device 10. The CPU 31 is configured to obtain and execute a variety of programs (which will be described later) from the memory 32, based on diverse signals to be output from the operation interface 24, a variety of information obtained from the external apparatus through the communication interface 25, and the like. That is, the CPU 31 and the memory 32 configure an example of the controller.

In the memory 32, an OS 34 and an apparatus program 35 are stored. In the meantime, the apparatus program 35 may be a single program or a combination of a plurality of programs. Also, in the memory 32, data or information necessary to execute the apparatus program 35 is stored. The memory 32 may be a RAM, a ROM, an EEPROM, a HDD, a portable storage medium such as a USB memory to be detachably mounted to the multi-function device 10, a buffer of the CPU 31 or a combination thereof.

The memory 32 may be a computer-readable storage medium. The computer-readable storage medium is a non-transitory medium. The non-transitory medium includes a recording medium such as a CD-ROM and a DVD-ROM, in addition to the above-described medium. Also, the non-transitory medium is a tangible medium. In the meantime, an electric signal for carrying a program to be downloaded from the server on the Internet 101 is a computer-readable signal medium, which is one of the computer-readable media, but is not included in the non-transitory computer-readable storage medium.

The memory 32 may be configured to store therein a condition list, as shown in FIGS. 2A and 2B, for example. The condition list includes one or more condition records. The condition record includes a part or all of specific identification information, state information, type information and custom URL associated with each other. One or both of the state information and the type information may be omitted. The condition record indicates that when a condition indicated by the specific identification information and the state information is satisfied, a custom XML indicated by a corresponding custom URL is to be obtained and processing defined in the obtained custom XML is to be executed. The specific identification information, the state information, the type information, and the custom URL will be described in detail later.

Upon shipment of the multi-function device 10, the condition record may not be stored in the memory 32. The apparatus program 35 is configured to transmit an HTML file defining a screen for prompting an input of information to be included in the condition record to the external apparatus (for example, a PC) through the communication interface 25, for example. Then, the apparatus program 35 is configured to receive the condition record from the external apparatus through the communication interface 25. This processing is an example of the second reception processing. Then, the apparatus program 35 is configured to register the received condition record in the condition list. This processing is an example of the third storing processing.

Also, although not shown, the memory 32 may be configured to associate and store therein a custom XML, and date and time information, which will be described later. The date and time information is information indicative of update date and time of a corresponding custom XML. The apparatus program 35 stores in the memory 32 the custom XML and the date and time information received from the server 60, in S24 (which will be described later), for example.

[Servers 50, 60]

The servers 50, 60 are configured to store therein the XML files. When a request for transmission of the XML file is received from the multi-function device 10, the servers 50, 60 transmit the requested XML file to the multi-function device 10. The servers 50, 60 may be Web servers configured to transmit the XML file by HTTP, for example. In the illustrative embodiment, the server 50 is identified by server identification information "www.server-std.com", and the server 60 is identified by server identification information "www.server-ctm.com".

The XML file is an example of the definition data for defining processing to be executed by the multi-function device 10. That is, in the XML file, processing to be executed by the multi-function device 10 is described by an XML. The XML file is largely classified into a screen definition XML, which is an example of the screen definition data, and an operation definition XML, which is an example of operation definition data. The screen definition XML defines a screen that is to be displayed on the display 23 of the multi-function device 10. The operation definition XML defines an operation (e.g., image processing) that is to be executed by the operating device (e.g., image processing device) of the multi-function device 10. The XML file is identified by data identification information such as "scan-upload1.xml", "download-print3.xml" and the like.

The server 50 is an example of the first server, which is provided by a manufacturing maker of the multi-function device 10, for example. The server 50 is configured to store therein standard XMLs shown in FIGS. 3A to 3C or standard XMLs shown in FIGS. 4A to 4C, for example. The standard XML stored in the server 50 is an example of the first definition data. The data identification information for identifying the standard XML is an example of the first identification information. The server 50 is configured to supply a uniform service to all the multi-function devices 10 manufactured by the manufacturing maker.

The server 60 is an example of the second server, which is provided by an organization (for example, a company, a school and the like) using the multi-function device 10, for example. The server 60 is configured to store therein custom XMLs shown in FIGS. 3D and 3E or custom XMLs shown in FIGS. 4D and 4E, for example. The custom XML stored in the server 60 is an example of the second definition data. The data identification information for identifying the custom XML is an example of the second identification information. The server 60 is configured to supply a customized service to the multi-function device 10 that is to be used by the organization having equipped the same.

Figure 6:
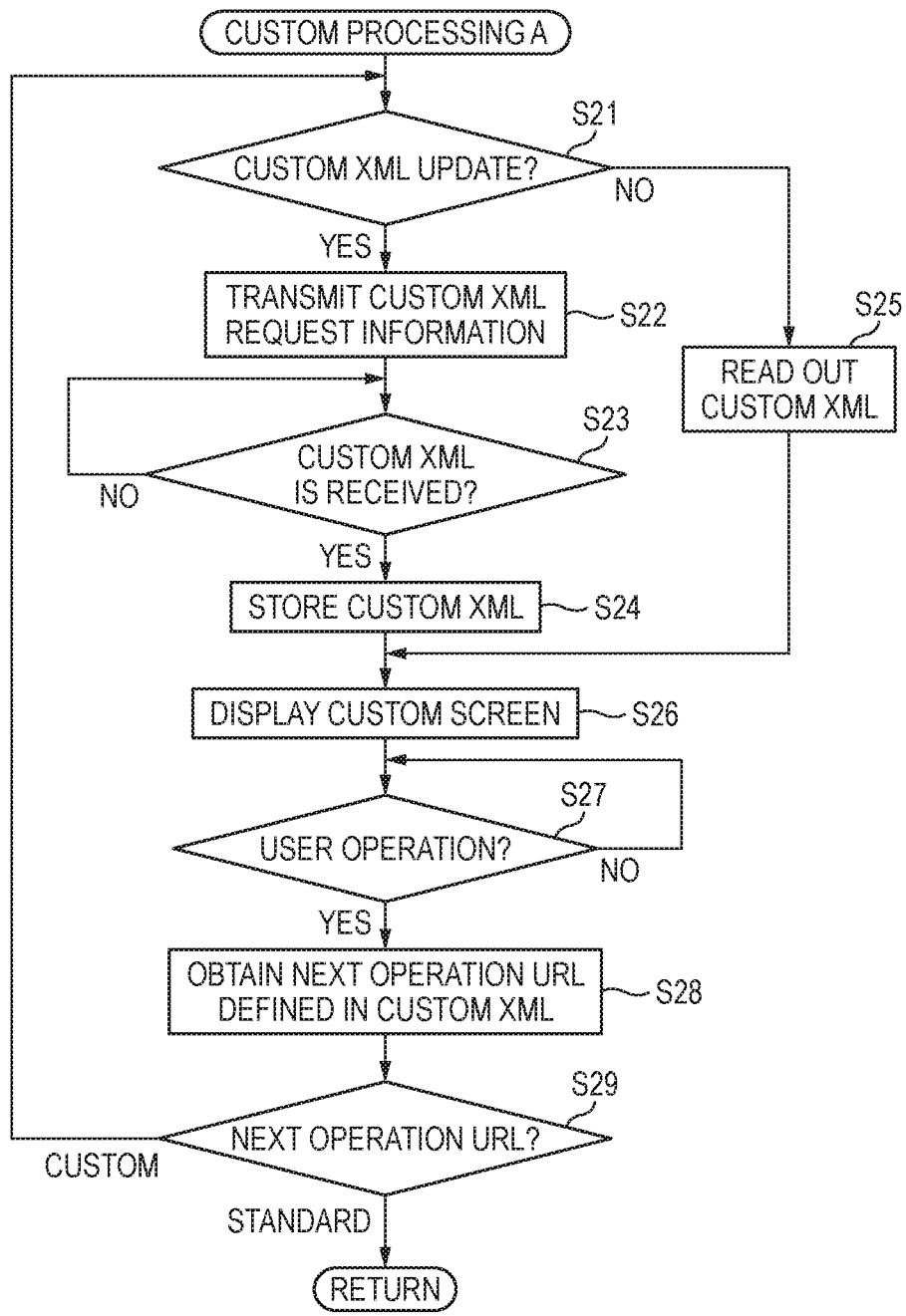
FIG. 6 is a flowchart of custom processing A.
Figure 7:
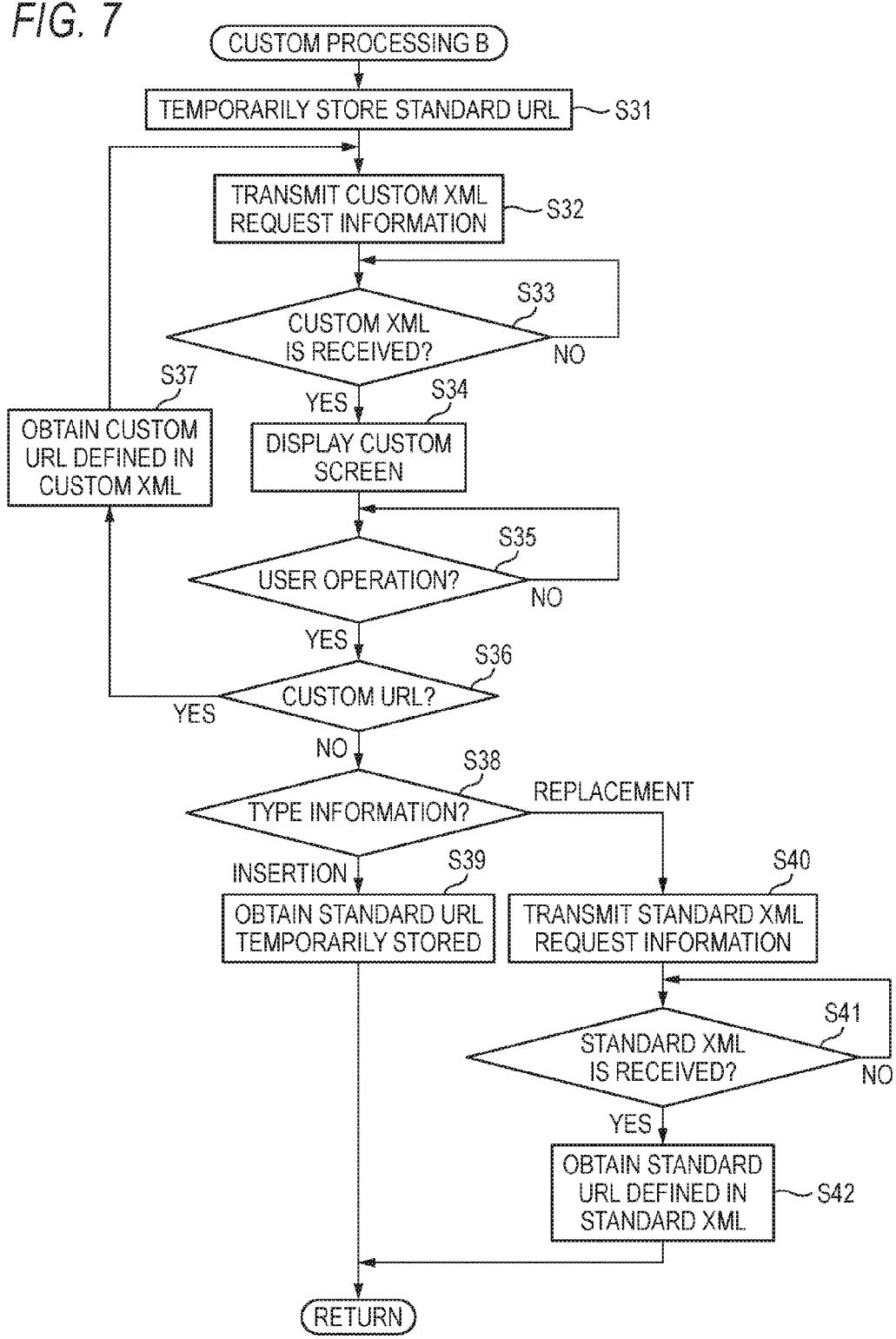
FIG. 7 is a flowchart of custom processing B.

Operations of the system 100 in accordance with the illustrative embodiment are described with reference to FIGS. 5 to 7.

A flowchart of the specification basically indicates processing of the CPU 31, which is to be executed in accordance with commands described in the program. That is, in the below descriptions, processing such as "determination", "extraction", "selection", "calculation", "decision", "specifying", "control" and the like indicates processing of the CPU 31. The processing that is to be executed by the CPU 31 includes hardware control via the OS 34, too. Also, in the specification, the term "data" is expressed by a computer-readable bit string. It is assumed that the data having the substantially same meaning and a different format is to be handled as the same data. This also applies to the "information" in the specification.

Figure 8A:
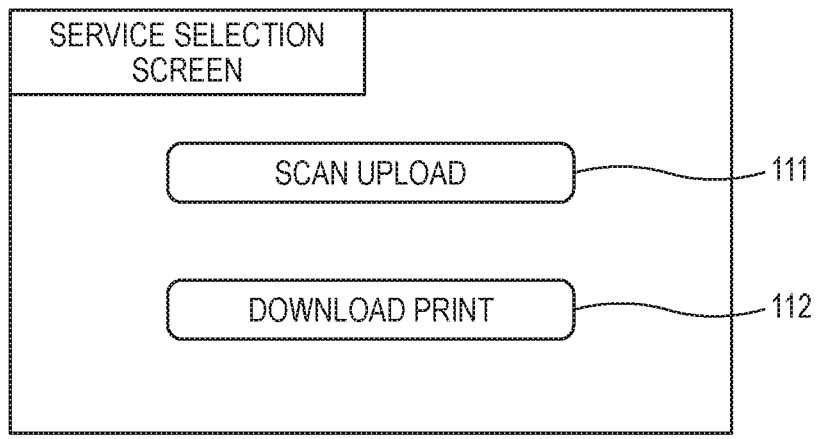

First, the apparatus program 35 is configured to display a service selection screen shown in FIG. 8A on the display 23. The service selection screen is a screen for prompting a user to select a service that is to be used through the multi-function device 10. The service selection screen includes a service icon 111 corresponding to the scan upload and a service icon 112 corresponding to the download print. The apparatus program 35 is configured to receive a user operation on the service selection screen through the operation interface 24.

Also, in the memory 32, a next operation URL "www.server-std.com/scan-upload1.xml" associated with the service icon 111 and a next operation URL "www.server-std.com/download-print1.xml" associated with the service icon 112 are stored. The next operation URL is information indicative of the XML file for defining processing that is to be executed next. The next operation URL includes the server identification information and the data identification information. The next operation URL is a standard URL including the server identification information of the server 50 and the data identification information of the standard XML or a custom URL including the server identification information of the server 60 and the data identification information of the custom XML.

[Scan Upload]

For example, when a designation of the service icon 111 is received through the operation interface 24, the apparatus program 35 receives a supply of the scan upload service. The processing of enabling the multi-function device 10 to execute the scan upload is described with reference to FIGS. 5 and 6. Meanwhile, it is assumed that the condition list shown in FIG. 2A is registered in the memory 32 of the multi-function device 10, the standard XMLs shown in FIGS. 3A to 3C are stored in the server 50 and the custom XML shown in FIGS. 3D and 3E are stored in the server 60.

In the condition list of FIG. 2A, the specific identification information is the first identification information for identifying one of the plurality of standard XMLs stored in the server 50. The state information is information indicative of a specific state of the multi-function device 10. In the illustrative embodiment, the specific state indicates a state logged in with a login ID "Guest".

In the illustrative embodiment, the multi-function device 10 can change a state from a login state to a non-login state. The login state indicates a state where a combination of a valid login ID and a valid password is input through the operation interface 24. The multi-function device 10 at the login state can execute only an operation allowed with being associated with the input login ID and cannot execute the other operations. The non-login state indicates a state where a combination of a valid login ID and a valid password has not been input. The multi-function device 10 at the non-login state can execute only a basic operation allowed to all users.

The login ID "Guest" is a login ID, for which the number of operations allowed with being associated is smallest, of the login IDs registered in the multi-function device 10, for example. The login ID "Guest" is a login ID issued for a plurality of unspecified users, for example. In the multi-function device 10, a login ID (hereinafter, referred to as "login ID of a registered user") different from the login ID "Guest" is also registered.

The apparatus program 35 can obtain the login ID input to the multi-function device 10 at the login state by executing an API provided by the OS 34, for example. The state logged in with the login ID "Guest" is an example of the specific state where the multi-function device 10 is used by a user different from a registered user registered in advance. Alternatively, the state logged in with the login ID "Guest" may also indicate the non-login state.

First, the apparatus program 35 reads out the next operation URL "www.server-std.com/scan-upload1.xml" stored with being associated with the service icon 111 from the memory 32. This processing is an example of the obtaining processing. Then, the apparatus program 35 determines whether the next operation URL conforms to the conditions indicated by the condition records registered in the condition list (S11). The processing of S11 is an example of the first determination processing.

More specifically, the apparatus program 35 executes following processing for each of the condition records registered in the condition list. First, the apparatus program 35 reads out one of the condition records from the memory 32. Then, the apparatus program 35 determines whether the data identification information included in the obtained next operation URL and the specific identification information included in the read condition record coincide with each other. When the data identification information and the specific identification information coincide with each other, the apparatus program 35 determines that the obtained next operation URL conforms to the condition indicated by the read condition record. On the other hand, when the data identification information and the specific identification information do not coincide with each other, the apparatus program 35 determines that the obtained next operation URL does not conform to the condition indicated by the read condition record.

Also, when the state information is included in the read condition record, the apparatus program 35 further determines whether a current state of the multi-function device 10 and a specific state indicated by the state information included in the read condition record coincide with each other. When the data identification information and the specific identification information coincide with each other and the current state of the multi-function device 10 is the specific state, the apparatus program 35 determines that the obtained next operation URL conforms to the condition indicated by the read condition record. On the other hand, when the current state of the multi-function device 10 is not the specific state, the apparatus program 35 determines that the obtained next operation URL does not conform to the condition indicated by the read condition record.

In the illustrative embodiment, the data identification information "scan-upload1.xml" coincides with the specific identification information of the condition record in a first line of FIG. 2A. That is, when the multi-function device 10 is logged in with the login ID "Guest", the apparatus program 35 determines that the obtained next operation URL conforms to the condition indicated by the condition record. On the other hand, when the multi-function device 10 is not logged in with the login ID "Guest", the apparatus program 35 determines that the obtained next operation URL does not conform to the conditions indicated by all the condition records.

When it is determined that the obtained next operation URL conforms to the condition indicated by the condition record in the first line of FIG. 2A (S11: Yes), the apparatus program 35 executes custom processing A by using the custom URL "www.server-ctm.com/scan-upload0.xml" included in the condition record (S12). On the other hand, when it is determined that the obtained next operation URL does not conform to the condition indicated by the condition record (S11: No), the apparatus program 35 executes processing of S13 and thereafter without executing the custom processing A. The custom processing A of the illustrative embodiment is described in detail with reference to FIG. 6.

First, the apparatus program 35 determines whether the custom XML identified by the data identification information "scan-upload0.xml" of the obtained custom URL has been updated in the server 60 (S21). Specifically, the apparatus program 35 determines whether the custom XML is stored in the memory 32. Also, the apparatus program 35 transmits date and time information request information for requesting transmission of date and time information of the custom XML to the server 60 through the communication interface 25. Then, the apparatus program 35 receives the date and time information, which is transmitted by the server 60 as a response to the date and time information request information, through the communication interface 25. Then, the apparatus program 35 compares the date and time information stored in the memory 32 with being associated with the custom XML and the date and time information of the custom XML received from the server 60. The processing of S21 is an example of the third determination processing.

When it is determined that the custom XML is not stored in the memory 32 or the two date and time information does not coincide with each other (S21: Yes), the apparatus program 35 transmits custom XML request information to the server 60 identified by the server identification information "www.server-ctm.com" of the custom URL through the communication interface 25 (S22). The custom XML request information is an example of the transmission request information for requesting transmission of the custom XML indicated by the data identification information of the custom URL. That is, the custom XML request information includes the data identification information "scan-upload0.xml" of the custom XML for which transmission is requested. The processing of S22 is an example of the transmission processing.

Then, the apparatus program 35 receives the custom XML shown in FIG. 3D from the server 60 through the communication interface 25, as a response to the custom XML request information (S23). Also, the apparatus program 35 associates and stores the date and time information received in S21 and the custom XML received in S23 in the memory 32 (S24). The processing of S23 is an example of the first reception processing, and the processing of S24 is an example of the second storing processing. On the other hand, when it is determined that the custom XML is stored in the memory 32 and the two date and time information coincides with each other (S21: No), the apparatus program 35 reads out the custom XML indicated by the data identification information "scan-upload0.xml" of the custom URL from the memory 32 (S25), instead of executing the processing of S22 and S23. The processing of S25 is an example of the readout processing.

Figure 8B:
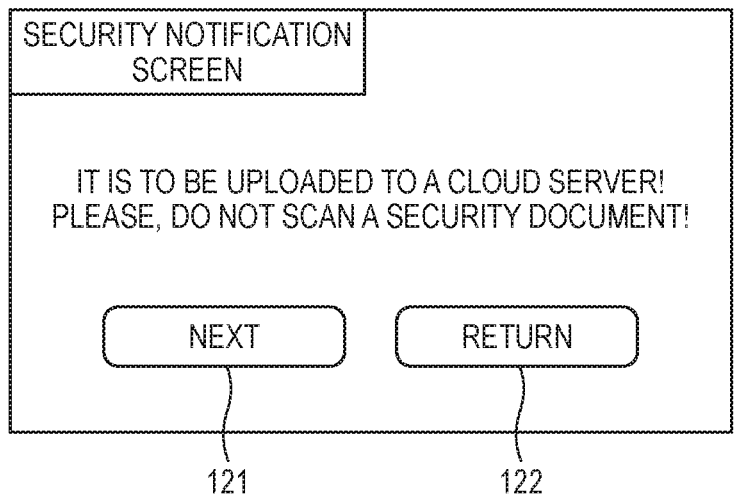

Then, the apparatus program 35 displays a custom screen defined in the custom XML received in S23 or in the custom XML read out in S25 on the display 23 (S26). In the illustrative embodiment, as the custom screen defined in the custom XML of FIG. 3D, a security notification screen shown in FIG. 8B is displayed on the display 23. Then, the apparatus program 35 receives a user operation on the security notification screen through the operation interface 24 (S27). The processing of S26 is an example of the display processing, and the processing of S27 is an example of the reception processing.

The security notification screen is an example of the definition screen for notifying the user of the scan upload service of a security precaution. The security notification screen includes a message "It is to be uploaded to a cloud server! Please, do not scan a security document!", and a [next] icon 121 and a [return] icon 122. Then, when a designation of the [next] icon 121 is received through the operation interface 24 (S27: Yes), the apparatus program 35 obtains the next operation URL www.server-std.com/scan-upload1.xml defined in the custom XML received in S23 or in the custom XML read out in S25 (S28).

More specifically, the apparatus program 35 obtains an element of a <NextURL> tag included in the custom XML, as the next operation URL. The processing of S28 is an example of the obtaining processing. Then, the apparatus program 35 determines whether the next operation URL obtained in S28 is any one of the standard URL and the custom URL (S29). Specifically, when the next operation URL obtained in S28 includes the server identification information of the server 50, the apparatus program 35 determines that the next operation URL is the standard URL, and when the next operation URL includes the server identification information of the server 60, the apparatus program 35 determines that the next operation URL is the custom URL.

When it is determined that the custom URL is obtained in S28 (S29: custom), the apparatus program 35 re-executes the processing of S21 and thereafter by using the custom URL. On the other hand, when it is determined that the standard URL is obtained in S28 (S28: standard), the apparatus program 35 ends the custom processing A. Also, although not shown, when a designation of the [return] icon 122 on the security notification screen is received through the operation interface 24, the apparatus program 35 ends the processing relating to the scan upload service.

Thereafter, returning to FIG. 5, the apparatus program 35 transmits standard XML request information, which includes the data identification information "scan-upload1.xml" of the standard URL, to the server 50 identified by the server identification information "www.server-std.com" of the standard URL obtained in the immediately preceding obtaining processing, through the communication interface 25 (S13). The standard XML request information is an example of the transmission request information for requesting transmission of the standard XML indicated by the data identification information of the standard URL. The processing of S13 is an example of the transmission processing.

Then, the apparatus program 35 receives the standard XML shown in FIG. 3A from the server 50 through the communication interface 25, as a response to the standard XML request information (S14). The processing of S14 is an example of the reception processing. Then, the apparatus program 35 determines whether the received standard XML is any one of the screen definition XML and the operation definition XML (S14). The determination method in S14 is not particularly limited. However, the apparatus program 35 may determine the XML file including a <NextURL> tag as the screen definition XML, and may determine the XML file including a <scan_upload> tag or <download_print> tag, as the operation definition XML.

Figure 9A:
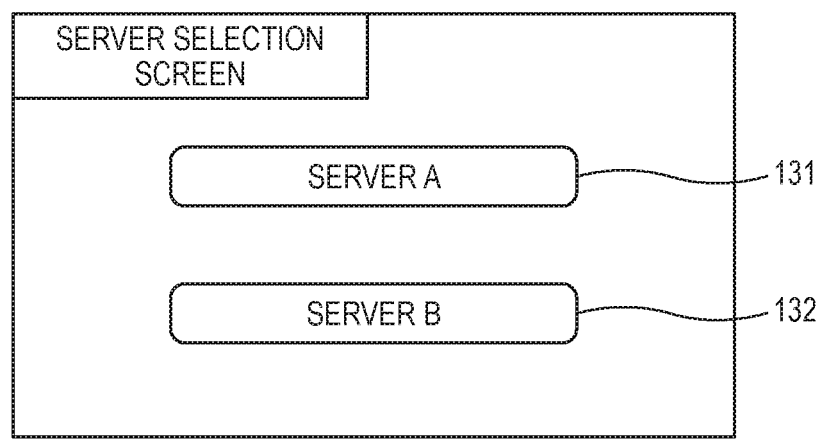

Then, when it is determined that the standard XML shown in FIG. 3A is the screen definition XML (S14: screen definition), the apparatus program 35 displays a standard screen defined in the standard XML on the display 23 (S15). In the illustrative embodiment, as the standard screen defined in the standard XML shown in FIG. 3A, a server selection screen shown in FIG. 9A is displayed on the display 23. Then, the apparatus program 35 receives a user operation on the server selection screen through the operation interface 24 (S16). The processing of S15 is an example of the display processing, and the processing of S16 is an example of the reception processing.

The server selection screen is an example of the definition screen for prompting the user to designate a server of an upload destination of image data generated in the scan operation. The server selection screen includes server icons 131, 132 corresponding to server identification information of servers A, B (not shown) on the Internet 101. The server identification information associated with the server icons 131, 132 is an example of the parameter. In the standard XML, a candidate of the parameter to be designated by the user is defined as an element of a <option> tag. This also applies to the other XML files. However, the specific definition method in the XML file is not limited thereto.

When a designation of the server icon 131 is received through the operation interface 24 (S16: Yes), for example, the apparatus program 35 temporarily stores the server identification information "server A" associated with the server icon 131 in the memory 32, as a parameter designated by the user. Then, the apparatus program 35 obtains the next operation URL "www.server-std.com/scan-upload2.xml" defined in the standard XML received in S14 (S17). More specifically, the apparatus program 35 obtains the element of the <NextURL> tag of the standard XML, as the next operation URL. The processing of S17 is an example of the obtaining processing. Then, the apparatus program 35 re-executes the processing of S11 and thereafter by using the obtained next operation URL.

That is, the apparatus program 35 determines that the data identification information "scan-upload2.xml" of the obtained next operation URL and the specific identification information of the condition record in a second line of FIG. 2A coincide with each other (S11: Yes). Then, the apparatus program 35 executes the custom processing A by using the custom URL "www.server-ctm.com/scan-upload2.xml" included in the condition record (S12). In the below, the detailed descriptions of the common points to the above-described custom processing A are omitted and differences are mainly described.

First, the apparatus program 35 transmits the custom XML request information to the server 60 identified by the server identification information "www.server-ctm.com" of the custom URL, through the communication interface 25 (S22). The custom XML request information transmitted here includes the data identification information "scan-upload2.xml" of the custom URL and the parameter "server A" received in the immediately preceding reception processing. Then, the apparatus program 35 receives a custom XML shown in FIG. 3E from the server 60 through the communication interface 25 (S23). In the meantime, although not shown, the custom XML received here includes the parameter "server A" included in the immediately preceding custom XML request information.

Figure 9B:
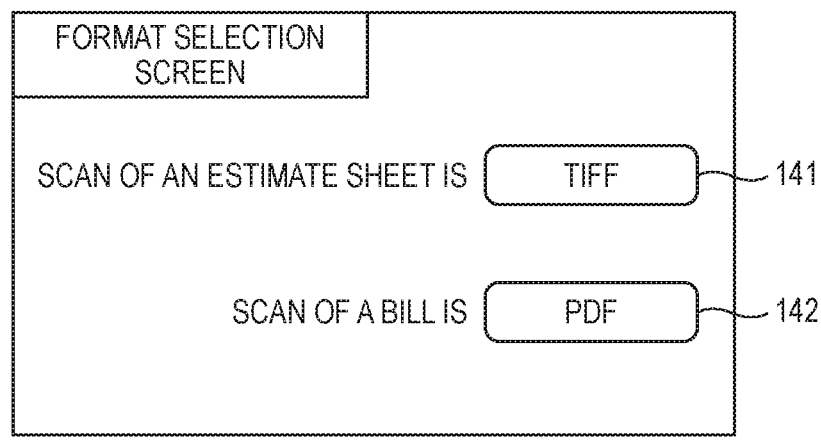

Then, the apparatus program 35 displays a custom screen defined in the custom XML of FIG. 3E on the display 23 (S26). In the illustrative embodiment, as the custom screen defined in the custom XML of FIG. 3E, a format selection screen shown in FIG. 9B is displayed on the display 23. Then, the apparatus program 35 receives a user operation on the format selection screen through the operation interface 24 (S27).

The format selection screen is an example of the definition screen for prompting the user to designate a file format of image data generated in the scan operation and notifying the user of a format to be selected depending on a type of a document to be scanned. The format selection screen includes a format icon 141 corresponding to a TIFF format and a format icon 142 corresponding to a PDF format. The format information associated with the format icons 141, 142 is an example of the parameter. Also, the format selection screen includes a message "scan of an estimate sheet is" added before the format icon 141 and a message "scan of a bill is" added before the format icon 142.

Then, when a designation of the format icon 141 is received through the operation interface 24 (S27: Yes), for example, the apparatus program 35 temporarily stores the format information "TIFF" associated with the format icon 141 in the memory 32, as a parameter designated by the user. Also, the apparatus program 35 obtains the next operation URL "www.server-std.com/scan-upload3.xml" defined in the custom XML of FIG. 3E (S28). Then, when it is determined that the standard URL has been obtained in S28 (S29: standard), the apparatus program 35 ends the custom processing A.

Again returning to FIG. 5, the apparatus program 35 transmits the standard XML request information to the server 50 identified by the server identification information "www.server-std.com" of the standard URL obtained in the immediately preceding obtaining processing, through the communication interface 25 (S13). The standard XML request information transmitted here includes the data identification information "scan-upload3.xml" of the standard URL, the parameter "server A" included in the custom XML received at the last time and the parameter "TIFF" received in the immediately preceding reception processing. That is, the standard XML request information includes all the parameters received in the past reception processing.

Then, the apparatus program 35 receives the standard XML shown in FIG. 3C from the server 50 through the communication interface 25 (S14). The standard XML shown in FIG. 3C includes the <scan upload> tag and the parameters "server A" and "TIFF" included in the immediately preceding standard XML request information. Then, when it is determined that the standard XML shown in FIG. 3C is the operation definition data (S14: operation definition), the apparatus program 35 enables the operating device (e.g., image processing device) to execute an operation (e.g., image processing) defined in the standard XML (S18). That is, the apparatus program 35 executes the scan upload in accordance with the parameters included in the standard XML. The processing of S18 is an example of the execution instruction processing.

More specifically, the apparatus program 35 enables the scanner 12 to generate image data of a TIFF format through the scan operation. Then, the apparatus program 35 transmits the image data generated in the scan operation to a server (not shown) identified the server identification information "server A" through the communication interface 25. In the meantime, when a screen for requesting the user to confirm whether or not to execute the processing of S18 is defined in the operation definition data, the apparatus program 35 may display the screen on the display 23. Then, when a user operation of instructing the execution of the processing of S18 is received through the operation interface 24, the apparatus program 35 may execute the processing of S18.

Figure 10A:
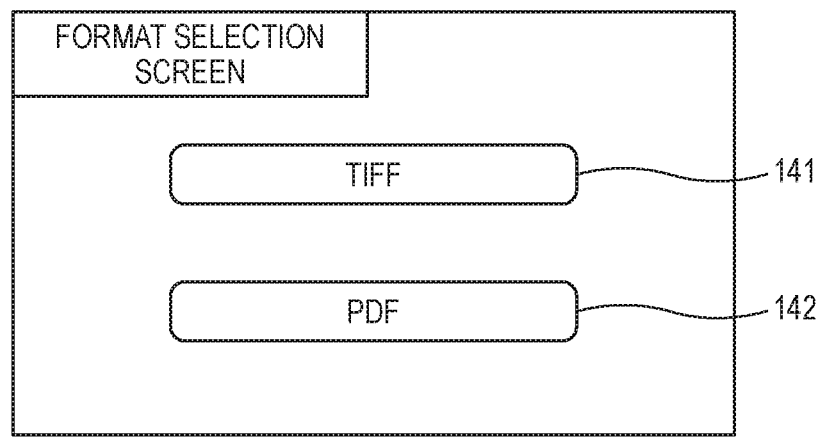

On the other hand, when the condition records shown in FIG. 2A are not registered in the condition list, the display of the security notification screen is omitted and a format selection screen of FIG. 10A, which is a standard screen defined in the standard XML shown in FIG. 3B, is displayed instead of the format selection screen shown in FIG. 9B. In other words, the condition records shown in FIG. 2A are registered in advance in the condition list, so that the precaution is notified through the security notification screen and the format to be selected through the format selection screen shown in FIG. 9B is notified. Thereby, it is possible to customize a series of processing relating to the scan upload. More specifically, when the scan upload service that is to be supplied by the server 50 is used as a work flow of a company, for example, it is possible to prevent a security document from being erroneously uploaded or a format different from a preset format from being designated.

[Download Print]

Also, when a designation of the service icon 112 on the service selection screen is received through the operation interface 24, for example, the apparatus program 35 receives a supply of the download print service. The processing of enabling the multi-function device 10 to execute the download print is described with reference to FIGS. 5 and 7. In the meantime, the detailed descriptions of the processing common to the scan upload are omitted, and differences are mainly described.

In the memory 32 of the multi-function device 10, the condition list shown in FIG. 2B has been registered. The condition records shown in FIG. 2B are different from the condition records shown in FIG. 2A, in that the type information is additionally included. For the type information, a first value "insertion" or a second value "replacement" is set.

The first value "insertion" corresponds to an instruction to use the custom XML identified by the corresponding custom URL "www.server-ctm.com/download-print0.xml" before the standard XML identified by the specific identification information "download-print1.xml". The second value "replacement" corresponds to an instruction to use the custom XML identified by the corresponding custom URL "www.server-ctm.com/download-print2.xml" instead of the standard XML identified by the corresponding specific identification information "download-print2.xml".

Also, the printer 11 of the illustrative embodiment is configured to record an image on a sheet by using toner stored in a detachable toner cartridge. The multi-function device 10 has a sensor configured to detect a remaining amount of the toner stored in the toner cartridge. The multi-function device 10 can perceive a remaining amount of the toner stored in the toner cartridge, based on a detection signal output from the sensor. The toner is an example of the consumable supply that is to be used for the print operation of the printer 11, and a state where the remaining amount of the toner is less than a threshold (for example, 10%) is an example of the specific state.

Also, it is assumed that the standard XMLs shown in FIGS. 4A to 4C are stored in the server 50 and the custom XMLs shown in FIGS. 4D and 4E are stored in the server 60. The custom XMLs shown in FIGS. 4D and 4E are different from the custom XMLs shown in FIGS. 3D and 3E, in that the <NextURL> tag can be omitted. Also, when the <NextURL> tag is included in the custom XML, the custom URL is set to the element of the tag.

First, the apparatus program 35 reads out the next operation URL "www.server-std.com/download-print1.xml" stored with being associated with the service icon 112 in the memory 32. This processing is an example of the obtaining processing. Then, the apparatus program 35 determines whether the next operation URL conforms to the conditions indicated by the condition records registered in the condition list (S11).

In the illustrative embodiment, the data identification information "download-print1.xml" and the specific identification information of the condition record in a first line of FIG. 2B coincide with each other. That is, when the remaining amount of the toner stored in the toner cartridge is less than 10%, the apparatus program 35 determines that the next operation URL conforms to the condition indicated by the condition record. On the other hand, when the remaining amount of the toner stored in the toner cartridge is equal to or more than 10%, the apparatus program 35 determines that the next operation URL does not conform to the conditions indicated by all the condition records.

When it is determined that the obtained next operation URL conforms to the condition indicated by the condition record in the first line of FIG. 2B (S11: Yes), the apparatus program 35 executes custom processing B by using the custom URL "www.server-ctm.com/download-print0.xml" included in the condition record (S12). The custom processing B of the illustrative embodiment is described in detail with reference to FIG. 7. The detailed descriptions of the processing common to the custom processing A are omitted, and differences are mainly described.

First, the apparatus program 35 temporarily stores the standard URL "www.server-std.com/download-print1.xml" obtained in the immediately preceding obtaining processing in the memory 32 (S31). The processing of S31 is an example of the first storing processing. Then, the apparatus program 35 transmits the custom XML request information including the data identification information "download-print0.xml" to the server 60 identified by the server identification information "www.server-ctm.com" of the custom URL, through the communication interface 25 (S32). The processing of S32 is an example of the transmission processing and may be the same as the processing of S22. Then, the apparatus program 35 receives the custom XML shown in FIG. 4D from the server 60 through the communication interface 25 (S33). The processing of S33 is an example of the reception processing and may be the same as the processing of S23.

Figure 10B:
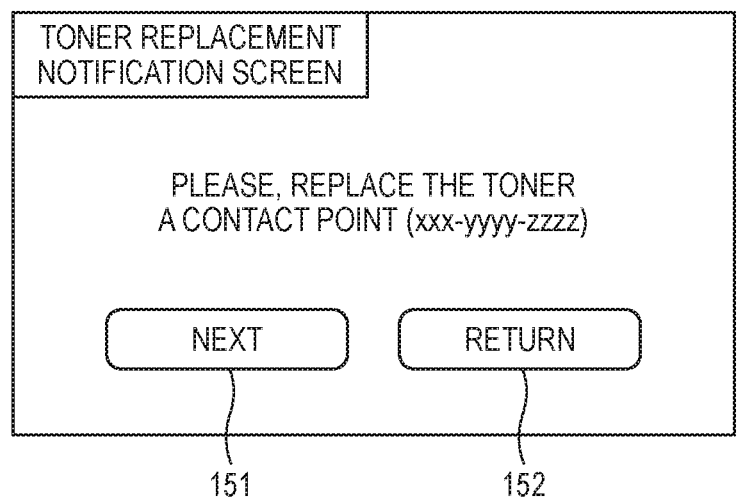

Then, the apparatus program 35 displays a custom screen defined in the custom XML shown in FIG. 4D on the display 23 (S34). In the illustrative embodiment, as the custom screen defined in the custom XML shown in FIG. 4D, a toner replacement notification screen shown in FIG. 10B is displayed on the display 23. The toner replacement notification screen is an example of the definition screen for notifying the user who uses the download print service that the toner should be replaced. The toner replacement notification screen includes a message "Please, replace the toner. A contact point (xxx-yyyy-zzzz)" and a [next] icon 151 and a [return] icon 152. Then, the apparatus program 35 receives a user operation on the toner replacement notification screen through the operation interface 24 (S35). The processing of S34 is an example of the display processing, and the processing of S35 is an example of the reception processing.

Then, when a designation of the [next] icon 151 is received through the operation interface 24 (S35: Yes), the apparatus program 35 determines whether the custom URL is included in the custom XML received in S33 (S36). When it is determined that the custom URL is included (S36: Yes), the apparatus program 35 obtains the custom URL (S37) and re-executes the processing of S32 and thereafter. The processing of S37 is an example of the obtaining processing. On the other hand, when it is determined that the custom URL is not included (S35: No), the apparatus program 35 determines a setting value of the type information of the condition record for which it has been determined in the immediately preceding processing of S11 that the condition is satisfied (S38). The processing of S38 is an example of the second determination processing.

Thereafter, when it is determined that the first value "insertion" is set for the type information (S38: insertion), the apparatus program 35 reads out the standard URL "www.server-std.com/download-print1.xml" temporarily stored in S31 from the memory 32, as the next operation URL (S39). The processing of S39 is an example of the obtaining processing. The processing of S40 to S42 will be described later. Also, although not shown, when a designation of the [return] icon 152 on the security notification screen is received through the operation interface 24, the apparatus program 35 ends the processing relating to the download print service.

Returning to FIG. 5, the apparatus program 35 transmits the standard XML request information including the data identification information "download-print1.xml" to the server 50 identified by the server identification information "www.server-std.com" of the standard URL obtained in the immediately preceding obtaining processing, through the communication interface 25 (S13). Then, the apparatus program 35 receives the standard XML shown in FIG. 4A from the server 50 through the communication interface 25 (S14).

Then, when it is determined that the standard XML shown in FIG. 4A is the screen definition XML (S14: screen definition), the apparatus program 35 displays a standard screen defined in the standard XML on the display 23 (S15). In the illustrative embodiment, as the standard screen defined in the standard XML of FIG. 4A, the server selection screen shown in FIG. 9A is displayed on the display 23.

Then, the apparatus program 35 receives a user operation on the server selection screen through the operation interface 24 (S16).

The server selection screen displayed here is an example of the definition screen for prompting the user to designate a server of a download source of the image data, which is a target of the print operation. The display contents of the server selection screen may be the same as those of the scan upload. Then, when a designation of the server icon 132 is received through the operation interface 24 (S16: Yes), for example, the apparatus program 35 temporarily stores the server identification information "server B" associated with the server icon 132 in the memory 32, as the parameter designated by the user.

Then, the apparatus program 35 obtains the next operation URL "www.server-std.com/download-print2.xml" defined in the standard XML of FIG. 4A (S17). Then, the apparatus program 35 determines that the data identification information "download-print2.xml" included in the obtained next operation URL and the specific identification information in a second line of FIG. 2B coincide with each other (S11: Yes). Then, the apparatus program 35 executes the custom processing B by using the custom URL "www.server-ctm.com/download-print2.xml" included in the condition record (S12). In the below, the detailed descriptions common to the above-described custom processing B are omitted, and differences are mainly described.

First, the apparatus program 35 temporarily stores the standard URL "www.server-std.com/download-print2.xml" obtained in the immediately preceding processing of S17 in the memory 32 (S31). Then, the apparatus program 35 transmits the custom XML request information to the server 60 identified by the server identification information "www.server-ctm.com" of the custom URL, through the communication interface 25 (S32). The custom XML request information transmitted here includes the data identification information "download-print2.xml" of the custom URL and the parameter "server B" received in the immediately preceding reception processing.

Figure 11A:
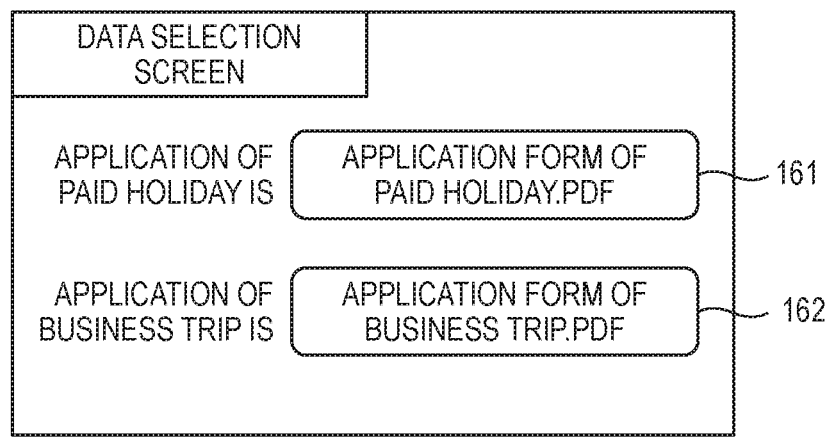

Then, the apparatus program 35 receives the custom XML shown in FIG. 4E from the server 60 through the communication interface 25 (S33). Although not shown, the custom XML received here includes the parameter "server B" included in the immediately preceding custom XML request information. Then, the apparatus program 35 displays a custom screen defined in the custom XML of FIG. 4E on the display 23 (S34). In the illustrative embodiment, as the custom screen defined in the custom XML of FIG. 4E, a data selection screen shown in FIG. 11A is displayed on the display 23.

The data selection screen is an example of the definition screen for prompting the user to designate image data, which is a target of the print operation, and notifying the user of a use application of each the image data. The data selection screen includes a data icon 161 corresponding to the data identification information "application form for paid holiday.PDF" and a data icon 162 corresponding to the data identification information "application form for business trip.PDF". The image data identified by the data identification information corresponding to the data icons 161, 162 is stored in the server B. The formats associated with the data icons 161, 162 are examples of the parameter. Also, the data selection screen includes a message "application of paid holiday is" added before the data icon 161 and a message "application of business trip is" added before the data icon 162.

Then, when a designation of the data icon 162 is received through the operation interface 24 (S35: Yes), for example, the apparatus program 35 temporarily stores the data identification information "application form of business trip-.PDF" associated with the data icon 162 in the memory 32, as the parameter designated by the use. Then, when it is determined that the custom URL is not included in the custom XML received in S33 and that the second value "replacement" is set for the type information of the condition record for which it has been determined in the immediately preceding processing of S11 that the condition is satisfied (S36: No & S38: replacement), the apparatus program 35 reads out the standard URL temporarily stored in S31.

Then, the apparatus program 35 transmits the standard XML request information including the data identification information "download-print2.xml" of the standard URL to the server 50 identified by the server identification information "www.server-std.com" of the read standard URL, through the communication interface 25 (S40). Then, the apparatus program 35 receives the standard XML shown in FIG. 4B from the server 50 through the communication interface 25 (S41: Yes). Then, the apparatus program 35 obtains the standard URL "www.server-std.com/download-print3.xml" included in the standard XML, as the next operation URL, without displaying the standard screen defined in the standard XML received in S41 (S42). The processing of S40 to S42 is an example of the obtaining processing of obtaining the standard URL defined in the standard XML identified by the standard URL temporarily stored in S31.

Again returning to FIG. 5, the apparatus program 35 transmits the standard XML request information to the server 50 identified by the server identification information "www.server-std.com" of the standard URL obtained in the immediately preceding obtaining processing, through the communication interface 25 (S13). The standard XML request information transmitted here includes the data identification information "download-print3.xml" of the standard URL, the parameter "server B" included in the custom XML received at the last minute and the parameter "application form of business trip.PDF" received in the immediately preceding reception processing.

Then, the apparatus program 35 receives the standard XML shown in FIG. 4C from the server 50 through the communication interface 25 (S14). Then, when it is determined that the standard XML shown in FIG. 4C is the operation definition data (S14: operation definition), the apparatus program 35 enables the operating device (e.g., image processing device) to execute an operation (e.g., image processing) defined in the standard XML (S18). That is, the apparatus program 35 executes the download print in accordance with the parameters included in the standard XML.

More specifically, the apparatus program 35 downloads the image data identified by the data identification information "application form of business trip.PDF" from the server B identified by the server identification information "server B" through the communication interface 25. Then, the apparatus program 35 enables the printer 11 to execute the print operation of recording an image expressed by the received image data on a sheet.

Figure 11B:
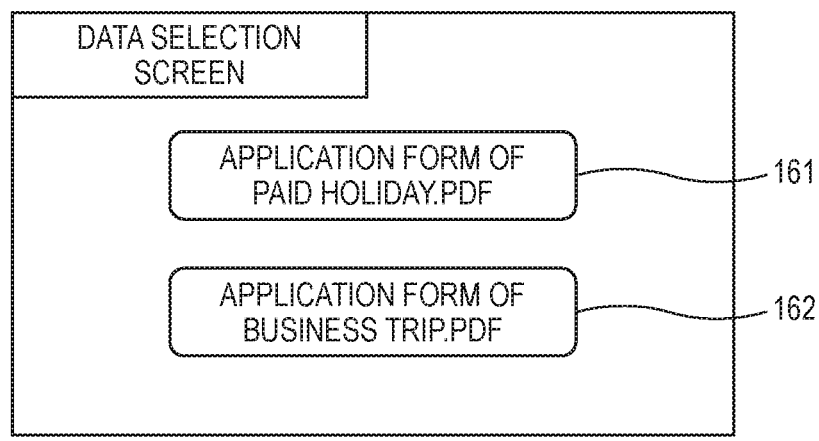

On the other hand, when the condition records shown in FIG. 2B are not registered in the condition list, the display of the toner replacement notification screen is omitted and a data selection screen of FIG. 11B is displayed instead of the data selection screen shown in FIG. 11A. In other words, the condition records shown in FIG. 2B are registered in advance in the condition list, so that the precaution is notified through the toner replacement notification screen and the image data to be selected through the data selection screen shown in FIG. 11A is notified. Thereby, it is possible to customize a series of processing relating to the download print. More specifically, when the download print service that is to be supplied by the server 50 is used as a work flow of a company, for example, it is possible to recognize in advance that the multi-function device 10 cannot execute the print operation and to enable the user to appropriately designate desired data.

[Operational Effects of Illustrative Embodiment]

According to the above illustrative embodiment, when the standard URL different from the specific identification information is obtained, the apparatus program 35 receives the standard XML identified by the standard URL from the server 50. On the other hand, when the standard URL, which is the same as the specific identification information, is obtained, the apparatus program 35 receives the custom XML identified by the custom URL associated with the specific identification information from the server 60.

In this way, the data identification information for identifying the standard XML to be customized of the plurality of XML files to be sequentially obtained is registered in advance in the memory 32, so that it is possible to receive the custom XML customized for each multi-function device 10. Also, the basic processing for implementing the service is defined in the standard XML and the processing to be customized for each organization using the multi-function device 10 is defined in the custom XML, so that it is possible to customize the service at lower cost, as compared to a configuration where all the processing is to be implemented with the custom XML.

Also, according to the illustrative embodiment, the state information is additionally added to the condition record, so that it is possible to customize the processing only when the multi-function device 10 is at the specific state. In the meantime, the specific state of the multi-function device 10 is not limited to the state logged in with the login ID "Guest", the state where the remaining amount of the toner is less than 10%, and the like. For example, a state where the multi-function device 10 and the server 50 cannot perform communication and a state where a sheet to be used for the print operation is not accommodated in a sheet feeding tray may be set as the specific state of the multi-function device 10.

For example, as shown in FIGS. 3D and 3E, the next operation URL may be set in the element of the <NextURL> tag of the custom XML. As another example, as shown in FIGS. 4D and 4E, the custom URL may be set in the <NextURL> tag of the custom XML or a desired value may be set for the type information of the condition record. Thereby, it is possible to enable the multi-function device 10 to continuously receive the custom XMLs and the multi-function device 10 to receive any standard XML from the custom XML.

According to the example of FIGS. 3D and 3E, it is possible to reduce an amount of the information (i.e., the type information) to be registered in the condition list. In the meantime, according to the example of FIGS. 4D and 4E, since it is not necessary to define the standard URL in the custom XML, it is not necessary to correct the custom XML when the server 50 is moved. Meanwhile, in the illustrative embodiment, the scan upload is implemented by the XML file having a format shown in FIGS. 3A-3E, and the download print is implemented by the XML file having a format shown in FIGS. 4A-4E. However, the disclosure is not limited thereto.

Also, when the custom URL is set in the element of the <NextURL> tag of the custom XML, the custom URL may include the data identification information and may not include the server identification information. When the custom URL including only the data identification information is obtained in the obtaining processing, the apparatus program 35 may receive the custom XML identified by the obtained data identification information from the server 60, which is a transmission source of the custom XML received at the last minute. Therefore, for example, when moving the custom XML stored in the server 60 to another server, it is not necessary to correct the server identification information in the custom XML.

Also, the custom XML may include a script. The apparatus program 35 may be configured to analyze the script defined in the received custom XML and to display the custom screen on the display 23 in accordance with an analysis result. The processing of analyzing the script is an example of the analysis processing. A script language may be Lua, Ruby, JavaScript (registered trademark) or the like. Thereby, the customization width of the custom screen is further widened.

Also, in the custom processing A of the illustrative embodiment, it is possible to reduce an amount of communication between the multi-function device 10 and the server 50 by reading out the custom XML stored in the memory 32 (S21:No→S25). This processing is not limited to the configuration where it is executed instead of S22 and S23 of the custom processing A, and may be executed instead of S13 and S14 of the main processing or S32 and S33 of the custom processing B. Also, the processing may be omitted.

Also, in the illustrative embodiment, the example where the custom XML is inserted before the first standard XML of the plurality of standard XMLs for implementing the service that is to be supplied by the server 50 and the second standard XML is replaced with the custom XML has been described. However, the insertion and replacement of the custom XML is not limited to the above example. For example, the custom XML may be inserted between the plurality of standard XMLs and the final standard XML may be replaced with the custom XML.

Also, in the illustrative embodiment, the example of the XML file in which the screen definition data includes the next operation URL and the operation definition data does not include the next operation URL has been described. However, the operation definition data may include the next operation URL. Also, the apparatus program 35 may be configured to determine whether the operation definition data includes the next operation URL, after the execution of S18, for example. Also, when it is determined that the operation definition data includes the next operation URL, the apparatus program 35 may execute the processing of S17 and thereafter.

Also, in the multi-function device 10 of the illustrative embodiment, the example where the diverse programs stored in the memory 32 are executed by the CPU 31, so that each processing to be executed by the controller of the disclosure is implemented has been described. However, the configuration of the controller is not limited thereto, and a part or all of the controller may be implemented by the hardware such as an integrated circuit.

Also, the disclosure may be implemented as the multi-function device 10 and as the program for enabling the multi-function device 10 to execute the processing. The program may be provided with being recorded in a non-transitory recording medium. The non-transitory recording medium may include a memory mounted to a server, which can be connected to the multi-function device 10 through the communication network, in addition to a CD-ROM, a DVD-ROM and the like. Also, the program stored in the memory of the server may be delivered through the communication network such as the Internet 101, as the information or signal indicative of the program.

What is claimed is:

1. An image processing apparatus comprising:
a communication interface;
a display;
an operation interface;
a memory;
an image processing device; and
a controller configured to:
    obtain data identification information;
    receive definition data, which is identified by the obtained data identification information, from a server through the communication interface;
    in response to the received definition data being screen definition data, display a definition screen defined in the screen definition data on the display;
    in response to the definition screen comprising a plurality of parameters, receive a designation operation of designating at least one of the plurality of parameters through the operation interface;
    in response to receiving the designation operation in the receiving of the designation operation, further obtain the data identification information defined in the screen definition data in the obtaining of the data identification information; and
    in response to the received definition data being operation definition data, control the image processing device to execute an image processing defined in the operation definition data in accordance with the designated parameter,
wherein the data identification information is first identification information for identifying first definition data stored in a first server or second identification information for identifying second definition data stored in a second server,
wherein the memory stores therein specific identification information, which is one of a plurality of the first identification information, and the second identification information with associating the specific identification information and the second identification information,
wherein in response to the obtained data identification information being the first identification information, the controller is configured to determine whether the first identification information coincides with the specific identification information, prior to receiving the definition data,
wherein in response to determining that the first identification information does not coincide with the specific identification information, the controller is configured to receive the first definition data identified by the first identification information from the first server, and
wherein in response to determining that the first identification information coincides with the specific identification information, the controller is configured to receive the second definition data identified by the second identification information associated with the specific identification information from the second server.

2. The image processing apparatus according to claim 1, wherein in response to receiving the second definition data and executing the displaying of the definition screen and receiving of the designation operation, the controller is further configured to:
   obtain the data identification information defined in the second definition data;
   in response to the obtained data identification information being the first identification information, receive the first definition data identified by the first identification information from the first server; and
   in response to the obtained data identification information being the second identification information, receive the second definition data identified by the second identification information from the second server.

3. The image processing apparatus according to claim 1, wherein the memory further stores therein type information with associating the specific identification information and the second identification information, and
   wherein a first value or a second value is set in the type information, the first value corresponding to an instruction to use the second definition data before the first definition data identified by the corresponding specific identification information, and the second value corresponding to an instruction to use the second definition data instead of the first definition data identified by the corresponding specific identification information,
   wherein in response to determining that the first identification information coincides with the specific identification information, the controller is further configured to store the first identification information in the memory, and
   wherein in response to receiving the second definition data and executing the displaying of the definition screen and receiving of the designation operation, the controller is further configured to:
      determine the value set in the type information;
      in response to determining that the first value is set, obtain the first identification information which has been stored in the storing of the first identification information in the obtaining of the data identification information;
      in response to determining that the second value is set, obtain the first identification information defined in the first definition data identified by the first identification information having been stored in the storing of the first identification information in the obtaining of the data identification information; and
      receive the first definition data identified by the obtained first identification information from the first server.

4. The image processing apparatus according to claim 1, wherein the controller is further configured to:
   store the received definition data in the memory;
   determine whether the definition data identified by the obtained data identification information and stored in the server has been updated after the definition data identified by the same data identification information is stored in the memory in the storing of the received definition data, prior to receiving the definition data;
   in response to determining that the definition data has been updated, receive the definition data from the server; and
   in response to determining that the definition data has not been updated, read out the definition data from the memory, instead of receiving the definition data from the server.

5. The image processing apparatus according to claim 1, wherein the controller is further configured to:
   receive the specific identification information and the second identification information from an external apparatus through the communication interface; and
   store the received specific identification information and the received second identification information in the memory with associating the specific identification information and the second identification information.

6. The image processing apparatus according to claim 1, wherein the memory further stores therein state information with being associated with the specific identification information and the second identification information, the state information being information indicative of a specific state of the image processing apparatus, and
   wherein the controller is further configured to:
      in the determining of whether the first identification information coincides with the specific identification information, further determine whether a state of the image processing apparatus is the specific state indicated by the state information;
      in response to determining the state of the image processing apparatus is not the specific state or in response to determining that the first identification information does not coincide with the specific identification information, receive the first definition data from the first server; and
      in response to determining that the state of the image processing apparatus is the specific state and in response to determining that the first identification information coincides with the specific identification information, receive the second definition data from the second server.

7. The image processing apparatus according to claim 6, wherein the specific state is at least one of: a state where a remaining amount of a consumable supply to be used for the image processing of the image processing device is less than a threshold; a state where the image processing apparatus cannot perform communication with the first server; and a state where the image processing apparatus is being used by a user different from a registered user registered in advance.

8. The image processing apparatus according to claim 1, wherein the controller is further configured to:
   transmit transmission request information to the server through the communication interface, the transmission request information requesting transmission of the definition data identified by the obtained data identification information, and the transmission request information comprising the parameter designated in the receiving of the designation operation;
   receive the definition data in the receiving of the definition data, as a response to the transmission request information; and
   control the image processing device to execute the image processing defined in the operation definition data in accordance with the parameter included in the operation definition data.

9. The image processing apparatus according to claim 1, wherein the controller is further configured to:
   analyze a script defined in the second definition data; and
   display the definition screen on the display in accordance with an analysis result in the analyzing of the script.

10. The image processing apparatus according to claim 1, wherein the controller is further configured to:
    in the receiving of the definition data when the server identification information and the data identification information area obtained in the obtaining of the data identification information, receive the definition data identified by the data identification information from the server that is identified by server identification information; and in the receiving of the definition data when only the data identification information is obtained in the obtaining of the data identification information, receive the definition data identified by the data identification information from the server that is identified by the server identification information obtained in the immediately preceding obtaining of the data identification information.

11. The image processing apparatus according to claim 1, wherein the definition data is described by an XML.

12. A non-transitory computer-readable medium having a computer program stored thereon and readable by a computer of an image processing apparatus, the image processing apparatus comprising a communication interface, a display, an operation interface, a memory and an image processing device configured to execute an image processing for image data, the computer program, when executed by the computer, cause the image processing apparatus to perform:

obtaining data identification information;

receiving definition data, which is identified by the obtained data identification information, from a server through the communication interface;

in response to the received definition data being screen definition data, displaying a definition screen defined in the screen definition data on the display;

in response to the definition screen including a plurality of parameters, receiving a designation operation of designating at least one of the plurality of parameters through the operation interface;

in response to receiving the designation operation in the receiving of the designation operation, further obtaining the data identification information defined in the screen definition data in the obtaining of the data identification information;

in response to the received definition data being operation definition data, controlling the image processing device to execute the image processing defined in the operation definition data in accordance with the designated parameter, wherein the data identification information is first identification information for identifying first definition data stored in a first server or second identification information for identifying second definition data stored in a second server, wherein the memory stores therein specific identification information, which is one of a plurality of the first identification information, and the second identification information with associating the specific identification information and the second identification information, wherein in response to the obtained data identification information being the first identification information, the computer program, when executed by the processor, causes the image processing apparatus to perform determining whether the first identification information coincides with the specific identification information, prior to receiving the definition data, wherein in response to determining that the first identification information does not coincide with the specific identification information, the computer program, when executed by the processor, causes the information processing apparatus to perform receiving the first definition data identified by the first identification information from the first server, and wherein in response to determining that the first identification information coincides with the specific identification information, the computer program, when executed by the processor, causes the information processing apparatus to perform receiving the second definition data identified by the second identification information associated with the specific identification information from the second server.

13. The non-transitory computer-readable medium according to claim 12, wherein in response to receiving the second definition data and executing the displaying of the definition screen and receiving of the designation operation, the computer program, when executed by the processor, further causes the image processing apparatus to perform:

obtaining the data identification information defined in the second definition data;

in response to the obtained data identification information being the first identification information, receiving the first definition data identified by the first identification information from the first server; and in response to the obtained data identification information being the second identification information, receiving the second definition data identified by the second identification information from the second server.

14. The non-transitory computer-readable medium according to claim 12, wherein the memory further stores therein type information with associating the specific identification information and the second identification information, and wherein a first value or a second value is set in the type information, the first value corresponding to an instruction to use the second definition data before the first definition data identified by the corresponding specific identification information, and the second value corresponding to an instruction to use the second definition data instead of the first definition data identified by the corresponding specific identification information, wherein in response to determining that the first identification information coincides with the specific identification information, the computer program, when executed by the processor, further causes the image processing apparatus to perform storing the first identification information in the memory, and wherein in response to receiving the second definition data and executing the displaying of the definition screen and receiving of the designation operation, the computer program, when executed by the processor, further causes the image processing apparatus to perform:

determining the value set in the type information;

in response to determining that the first value is set, obtaining the first identification information which has been stored in the storing of the first identification information in the obtaining of the data identification information;

in response to determining that the second value is set, obtaining the first identification information defined in the first definition data identified by the first identification information having been stored in the storing of the first identification information in the obtaining of the data identification information; and receiving the first definition data identified by the obtained first identification information from the first server.

15. The non-transitory computer-readable medium according to claim 12, wherein the computer program, when executed by the processor, further causes the image processing apparatus to perform:
- storing the received definition data in the memory;
- determining whether the definition data identified by the obtained data identification information and stored in the server has been updated after the definition data identified by the same data identification information is stored in the memory in the storing of the received definition data, prior to receiving the definition data;
- in response to determining that the definition data has been updated, receiving the definition data from the server; and
- in response to determining that the definition data has not been updated, reading out the definition data from the memory, instead of receiving the definition data from the server.

16. The non-transitory computer-readable medium according to claim 12,
- wherein the memory further stores therein state information with being associated with the specific identification information and the second identification information, the state information being information indicative of a specific state of the image processing apparatus, and
- wherein the computer program, when executed by the processor, further causes the image processing apparatus to perform:
  - in the determining of whether the first identification information coincides with the specific identification information, further determining whether a state of the image processing apparatus is the specific state indicated by the state information;
  - in response to determining the state of the image processing apparatus is not the specific state or in response to determining that the first identification information does not coincide with the specific identification information, receiving the first definition data from the first server; and
  - in response to determining that the state of the image processing apparatus is the specific state and in response to determining that the first identification information coincides with the specific identification information, receiving the second definition data from the second server.

17. The non-transitory computer-readable medium according to claim 16, wherein the specific state is at least one of: a state where a remaining amount of a consumable supply to be used for the image processing of the image processing device is less than a threshold; a state where the image processing apparatus cannot perform communication with the first server; and a state where the image processing apparatus is being used by a user different from a registered user registered in advance.

18. The non-transitory computer-readable medium according to claim 12, wherein the computer program, when executed by the processor, further causes the image processing apparatus to perform:
- transmitting transmission request information to the server through the communication interface, the transmission request information requesting transmission of the definition data identified by the obtained data identification information, and the transmission request information comprising the parameter designated in the receiving of the designation operation;
- receiving the definition data in the receiving of the definition data, as a response to the transmission request information; and
- controlling the image processing device to execute the image processing defined in the operation definition data in accordance with the parameter included in the operation definition data.

19. The non-transitory computer-readable medium according to claim 12, wherein the definition data is described by an XML.

* * * * *